US012780291B2

(12) United States Patent
Kwon

(10) Patent No.: US 12,780,291 B2
(45) Date of Patent: Nov. 3, 2026

(54) STEER-BY-WIRE STEERING DEVICE

(71) Applicant: HL MANDO CORPORATION, Pyeongtaek-si (KR)

(72) Inventor: Hyunbi Kwon, Yongin-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 483 days.

(21) Appl. No.: 18/376,105

(22) Filed: Oct. 3, 2023

(65) Prior Publication Data

US 2024/0116559 A1 Apr. 11, 2024

(30) Foreign Application Priority Data

Oct. 7, 2022 (KR) ........................ 10-2022-0128785

(51) Int. Cl.

| | |
|---|---|
| ***B62D 5/00*** | (2006.01) |
| ***B62D 5/04*** | (2006.01) |
| ***B62D 6/00*** | (2006.01) |
| ***B62D 15/02*** | (2006.01) |

(52) U.S. Cl.

CPC ............. *B62D 5/006* (2013.01); *B62D 5/001* (2013.01); *B62D 5/0409* (2013.01); *B62D 5/046* (2013.01); *B62D 5/0484* (2013.01); *B62D 15/021* (2013.01); *B62D 15/0235* (2013.01); *B60Y 2306/13* (2013.01); *B60Y 2400/83* (2013.01); *B62D 5/003* (2013.01); *B62D 5/005* (2013.01); *B62D 6/008* (2013.01)

(58) Field of Classification Search

CPC .... B62D 5/006; B62D 15/0235; B62D 5/003; B62D 5/005; B62D 5/001; B62D 5/0409; B62D 5/046; B62D 6/008; B62D 5/0484; B62D 15/021; B60Y 2306/13; B60Y 2400/83

See application file for complete search history.

(56) References Cited

U.S. PATENT DOCUMENTS 5,236,335 A * 8/1993 Takeuchi ............... B62D 5/001 180/404
5,251,135 A * 10/1993 Serizawa ............... B62D 6/003 180/402
5,796,248 A * 8/1998 Weber ..................... F02D 11/10 324/207.16

(Continued)

FOREIGN PATENT DOCUMENTS

CN 112334376 A 2/2021
CN 112537368 A 3/2021

(Continued)

OTHER PUBLICATIONS

Office Action dated Oct. 31, 2024 for corresponding Korean Patent Application No. 10-2022-0128785, along with an English machine translation (10 pages).

(Continued)

*Primary Examiner* — Timothy Wilhelm
(74) *Attorney, Agent, or Firm* — Hauptman Ham, LLP

(57) ABSTRACT

A steer-by-wire steering device may provide a steering reaction force to the driver when the electronic control system fails by securing mechanical reliability, suppress an increase in production costs while enhancing reliability, and secure the reliability of the steering angle sensing structure.

17 Claims, 13 Drawing Sheets

(56) References Cited

U.S. PATENT DOCUMENTS 5,896,942 A * 4/1999 Bohner .................. B62D 5/005 180/444
5,931,256 A * 8/1999 Langkamp ............ B62D 6/008 180/405
6,336,519 B1 * 1/2002 Bohner .................... B62D 5/30 180/406
6,612,392 B2 * 9/2003 Park ....................... B62D 5/005 701/41
6,637,543 B2 * 10/2003 Card ...................... B62D 7/159 701/41
6,705,419 B2 * 3/2004 Menjak .................. B62D 5/006 180/444
6,736,236 B2 * 5/2004 Kurishige ............ B62D 5/0466 180/443
6,795,763 B2 * 9/2004 Yao ........................ B62D 6/008 701/44
6,847,177 B1 * 1/2005 Gluch .................... H02K 29/06 318/567
7,034,483 B2 * 4/2006 Takahashi .............. B62D 6/008 318/434
7,130,728 B2 * 10/2006 Suzuki .................. B62D 6/008 180/413
7,177,744 B2 * 2/2007 Tanaka ..................... F16F 1/32 701/41
7,233,850 B2 * 6/2007 Nakano .................. B62D 6/008 180/413
7,418,326 B2 * 8/2008 Ogawa ................... B62D 6/008 701/41
7,595,577 B2 * 9/2009 Niguchi ................. H02K 29/03 310/156.01
7,694,777 B2 * 4/2010 Yamashita ........... B62D 5/0484 180/443
7,946,195 B2 * 5/2011 Ito .......................... B62D 5/001 180/402
8,066,091 B2 * 11/2011 Ito ............................ B62D 5/30 180/406
8,177,019 B2 * 5/2012 Koyama ................ B62D 6/008 180/402
8,672,084 B2 * 3/2014 Watanabe ............ B62D 7/1581 180/408
8,903,609 B2 * 12/2014 Kim ..................... B62D 5/0409 701/41
9,366,523 B2 * 6/2016 Klimenko ............... F24S 20/69
9,381,939 B2 * 7/2016 Chai .................... B62D 15/021
9,457,838 B2 * 10/2016 Tsunoda ................. B62D 5/049
9,623,900 B2 * 4/2017 Yukitake ................ B62D 5/003
9,932,069 B2 * 4/2018 Sugiyama .............. B62D 5/001
10,392,050 B2 * 8/2019 Kim ....................... B62D 5/006
10,661,823 B2 * 5/2020 Delmarco .............. B62D 5/005
10,940,882 B2 * 3/2021 Kim ....................... B62D 5/006
10,953,912 B2 * 3/2021 Rawlings .............. F16H 57/039
11,075,599 B2 * 7/2021 Shiino .................. B62D 5/0463
11,167,793 B2 * 11/2021 Hong ................... B62D 5/0469
11,780,493 B2 * 10/2023 Shimizu ................ B60W 10/04 701/41
11,897,553 B2 * 2/2024 Shin ....................... B62D 5/046
11,945,518 B2 * 4/2024 Fujita ..................... B62D 5/001
12,030,559 B2 * 7/2024 Kakimoto ............ B62D 15/021
12,116,051 B2 * 10/2024 Kakas .................... B62D 5/003
12,258,080 B2 * 3/2025 Ojima .................. B62D 15/021
12,286,168 B2 * 4/2025 Ojima .................... B62D 5/006
12,304,575 B2 * 5/2025 Tarandek ............... B62D 5/005
12,319,364 B2 * 6/2025 Yeom ..................... B62D 5/005
12,337,905 B2 * 6/2025 Yeom ..................... B62D 5/001
12,497,093 B2 * 12/2025 Kim ....................... B62D 5/006
2001/0056317 A1 * 12/2001 Nishizaki ............... B62D 6/003 701/41
2002/0108804 A1 * 8/2002 Park ....................... B62D 5/005 180/444
2002/0189888 A1 * 12/2002 Magnus ................. B62D 5/006 180/443
2003/0127276 A1 * 7/2003 Shimizu ................. B62D 1/163 180/443
2003/0141135 A1 7/2003 Menjak et al.
2004/0088093 A1 * 5/2004 Yao ........................ B62D 6/008 180/443
2006/0169519 A1 * 8/2006 Osonoi .................. B62D 1/163 180/402
2007/0107974 A1 * 5/2007 Ueno ..................... H02K 21/14 180/444
2007/0168093 A1 * 7/2007 Nishiyama ........... B62D 5/0466 701/41
2010/0168964 A1 * 7/2010 Higashi .................. B62D 5/008 701/42
2012/0111658 A1 * 5/2012 Hori ....................... B62D 6/008 180/446
2013/0138300 A1 * 5/2013 Hayama ................. B62D 5/046 701/43
2014/0343697 A1 * 11/2014 Kuipers ................ B60W 50/16 700/83
2020/0047764 A1 * 2/2020 Yamashita ...... B60W 30/18145
2021/0016830 A1 * 1/2021 Riese ..................... B62D 6/008
2021/0070361 A1 * 3/2021 Erickson ............ B62D 15/0235
2021/0261186 A1 * 8/2021 Hikida ................... B62D 15/02
2021/0269083 A1 * 9/2021 Hikida ....................... F16H 1/22
2022/0185364 A1 * 6/2022 Kwon .................. B62D 5/0406
2022/0281515 A1 * 9/2022 Kwon .................... B62D 5/001
2022/0324506 A1 * 10/2022 Tarandek ................. B62D 6/02
2022/0410966 A1 * 12/2022 Fujita ........................ G01D 5/12
2023/0014650 A1 * 1/2023 Kim .......................... H02K 5/04
2024/0088814 A1 * 3/2024 Tomizawa ........... B62D 5/0484
2024/0101183 A1 * 3/2024 Kwon .................... B62D 5/005
2024/0286665 A1 * 8/2024 Kawamura .............. B62D 5/04

FOREIGN PATENT DOCUMENTS

| | | | |
|---|---|---|---|
| CN | 113272201 | A | 8/2021 |
| CN | 114641422 | A | 6/2022 |
| JP | 2004-314736 | A | 11/2004 |
| JP | 2005-289218 | A | 10/2005 |
| JP | 2006-1483 | A | 1/2006 |
| KR | 10-1987-0008779 | A | 10/1987 |
| KR | 10-0833565 | B1 | 5/2008 |
| KR | 10-2021-0051430 | A | 5/2021 |

OTHER PUBLICATIONS

Office Action dated May 30, 2026, for the corresponding Chinese Patent Application No. 202311288925.6, along with an English machine translation (Total 14 pages).

* cited by examiner

STEER-BY-WIRE STEERING DEVICE

CROSS-REFERENCE TO RELATED APPLICATION

The present application claims the benefit of priority to Korean Patent Application No. 10-2022-0128785, filed on Oct. 7, 2022 in the Korean Intellectual Property Office, which is hereby incorporated by reference.

TECHNICAL FIELD

The present disclosure relates to a steer-by-wire steering device and, more specifically, to a steer-by-wire steering device that may provide a steering reaction force to the driver when the electronic control system fails by securing mechanical reliability, suppress an increase in production costs while enhancing the reliability of the steering reaction force providing structure, and secure the reliability of the steering angle sensing structure.

BACKGROUND

A steer-by-wire steering device is a kind of electromotive steering device that steers the vehicle using electric power without any mechanical connection, such as a steering column or universal joint, between the steering wheel and the front wheel steering device.

In other words, the driver's manipulation of the steering wheel is converted into an electric signal, and the electronic control device receives the electric signal and accordingly determines the output of the motor. Due to a lack of mechanical connection, the steer-by-wire system reduces injury to the driver by a mechanical part when a car crash occurs. Further, by saving parts, e.g., hydraulic parts and mechanical connections, the steer-by-wire system may lead to lightweight vehicles and a significant reduction in assembly line man-hour, thereby saving unnecessary energy consumption during steering and hence enhancing fuel efficiency. Further, it is possible to achieve ideal steering performance by ECU programming.

Due to lack of mechanical linkage between the steering shaft and the wheels, steer-by-wire steering devices do not directly convey the sensation of weight, coming from wheel friction against the road or being stuck, to the driver. There are known structures that provide the sense of steering to the driver by arbitrarily generating a steering reaction force using, e.g., a motor.

However, the problem with the steer-by-wire steering device is that if the electronic system fails, the driver cannot steer, which can cause a major accident. Accordingly, reliability requirements for a steer-by-wire steering device have recently increased. To meet this demand, it is known to configure redundancy of the control system of the motor that produces the steering reaction force.

However, even with redundancy, if the entire motor control system fails, steering reaction force cannot be provided, so mechanical reliability is required.

In addition, the redundancy of the motor control system increases the production costs of the steering system, which makes it difficult to apply the steer-by-wire steering device to relatively low-cost vehicles.

Meanwhile, since the steer-by-wire steering device requires a sensor to sense the driver's steering angle to steer the wheels, the reliability of the steering angle sensing is also required.

Therefore, there is a need for a steer-by-wire steering device with mechanical reliability of the steering reaction force providing structure. Furthermore, there is a need for a steer-by-wire steering device that can secure mechanical reliability while suppressing an increase in production costs. A need also exists for a steer-by-wire steering device with a reliable steering angle sensing structure.

The information disclosed in the Background section above is to aid in the understanding of the background of the present disclosure, and should not be taken as acknowledgement that this information forms any part of prior art.

BRIEF SUMMARY

Various aspects of the present disclosure may be directed to a steer-by-wire steering device that may provide a steering reaction force to the driver when the electronic control system fails by securing mechanical reliability, suppress an increase in production costs while enhancing the reliability of the steering reaction force providing structure, and secure the reliability of the steering angle sensing structure.

Various aspects of the present disclosure may be directed to a steer-by-wire steering device comprising a steering shaft, a first reaction force generator including at least one motor connected to the steering shaft, at least one electronic control unit (ECU) controlling the at least one motor to generate a first steering reaction force to the steering shaft, and at least one sensor for sensing a steering angle, and a second reaction force generator generating a second steering reaction force generated by rotation of the steering shaft to the steering shaft.

Various aspects of the present disclosure may be directed to a steer-by-wire steering device comprising a steering shaft, a first reaction force generator including at least one motor connected to the steering shaft, at least one electronic control unit (ECU) controlling the at least one motor to generate a first steering reaction force to the steering shaft, and at least one sensor for sensing a steering angle, and a second reaction force generator including a gear being rotatable in engagement with the steering shaft, a plate having a guide rail, a pin being movable on the guide rail as the gear rotates, and an elastic member providing a restoring force to a center of the guide rail to the pin and generating a second steering reaction force generated by rotation of the steering shaft to the steering shaft.

Various aspects of the present disclosure may be directed to a steer-by-wire steering device that may provide a steering reaction force to the driver when the electronic control system fails by securing mechanical reliability, suppress an increase in production costs while enhancing the reliability of the steering reaction force providing structure, and secure the reliability of the steering angle sensing structure.

The effects of the present disclosure are not limited to the aforementioned effect, and other effects, which are not mentioned above, will be apparent to a person having ordinary skill in the art and which will be apparent from or are set forth in more detail in the accompanying drawings, which are incorporated herein, and the following Detailed Description, which together serve to explain certain principles of the present disclosure.

DESCRIPTION OF DRAWINGS

The above and other objects, features, and advantages of the disclosure will be more clearly understood from the following detailed description, taken in conjunction with the accompanying drawings, in which.

Figure 1:
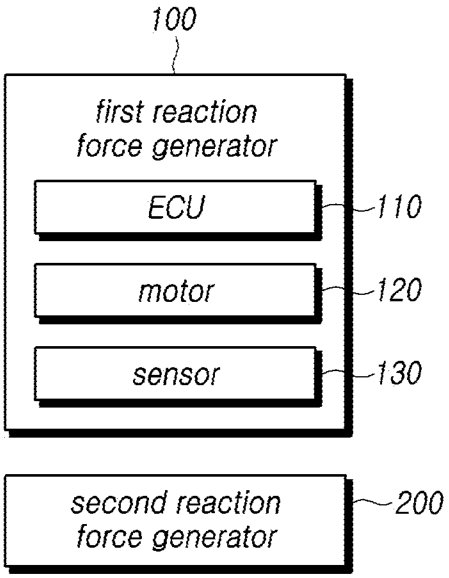
FIG. 1 is a view illustrating a configuration of a steer-by-wire steering device according to one exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description may make the subject matter in some embodiments of the disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Figure 2:
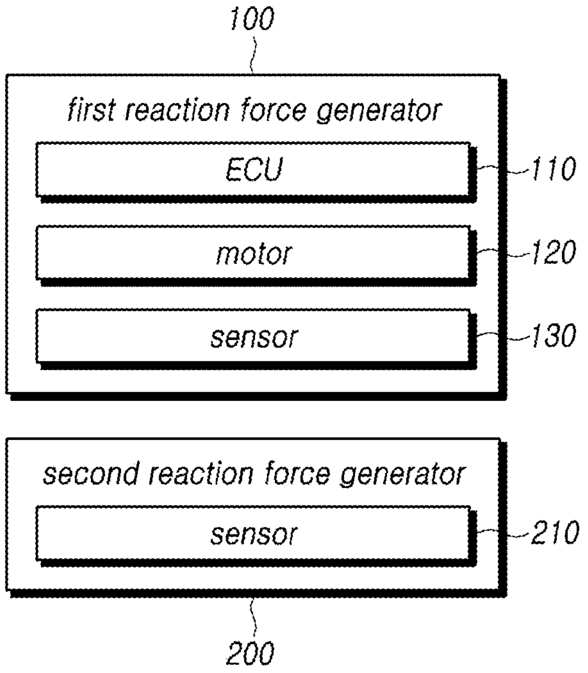
FIG. 2 is a view illustrating a configuration of a steer-by-wire steering device according to one exemplary embodiment of the present disclosure.
Figure 3:
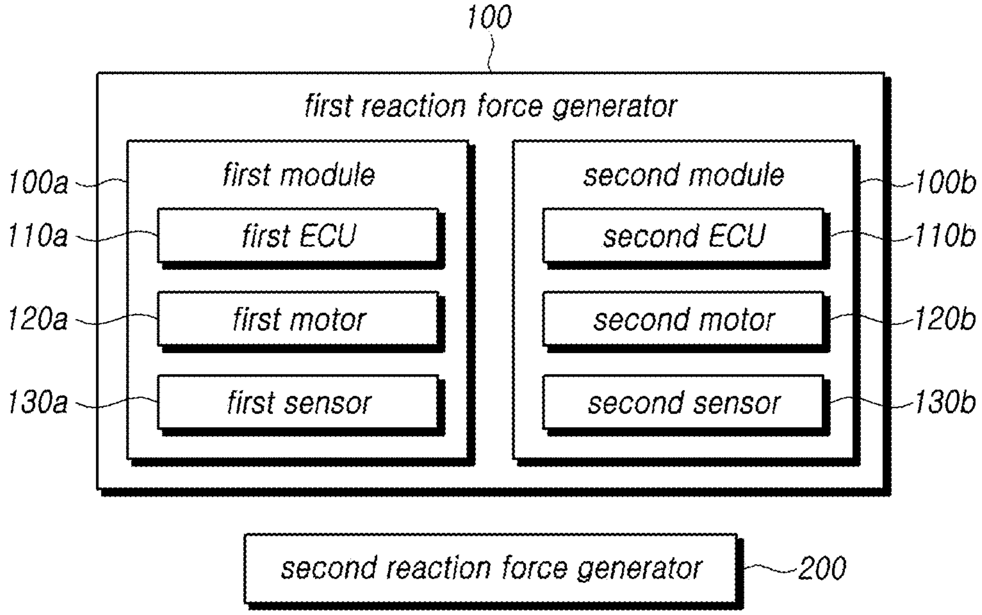
FIG. 3 is a view illustrating a configuration of a steer-by-wire steering device according to one exemplary embodiment of the present disclosure.
Figure 4:
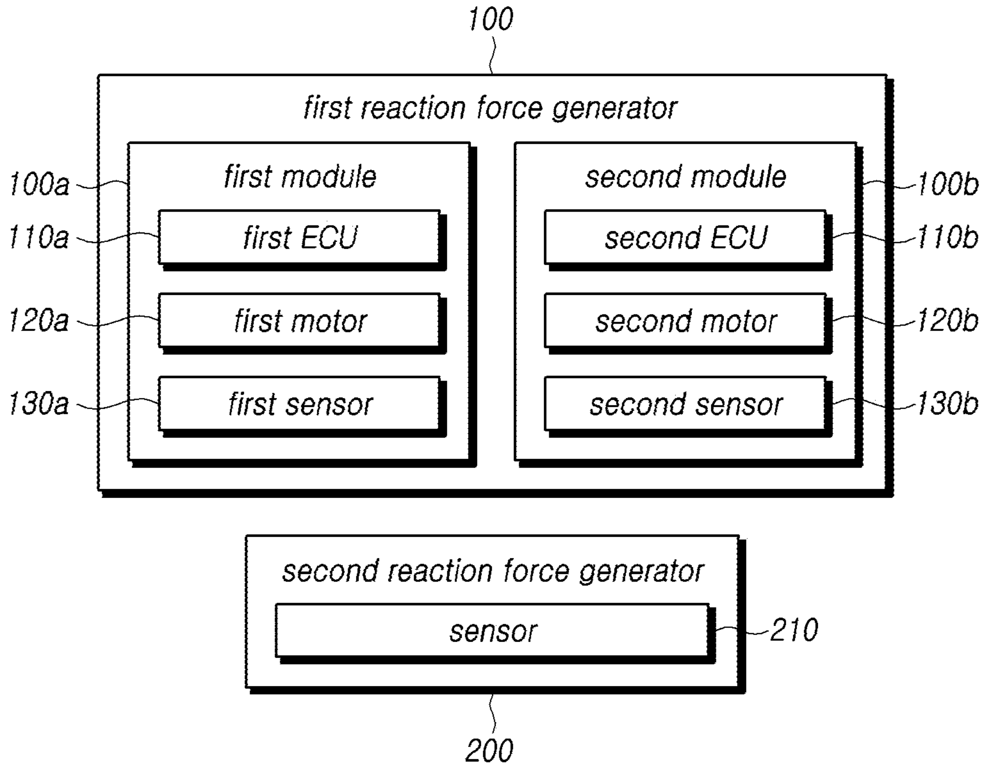
FIG. 4 is a view illustrating a configuration of a steer-by-wire steering device according to one exemplary embodiment of the present disclosure.
Figure 5:
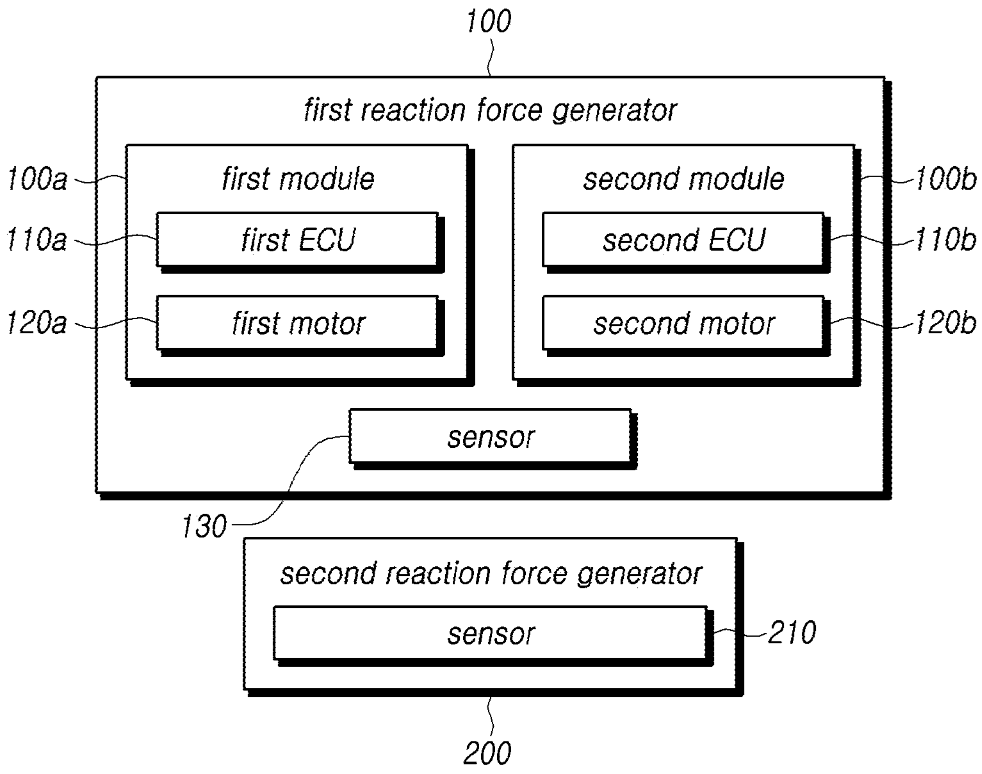
FIG. 5 is a view illustrating a configuration of a steer-by-wire steering device according to one exemplary embodiment of the present disclosure.
Figure 6:
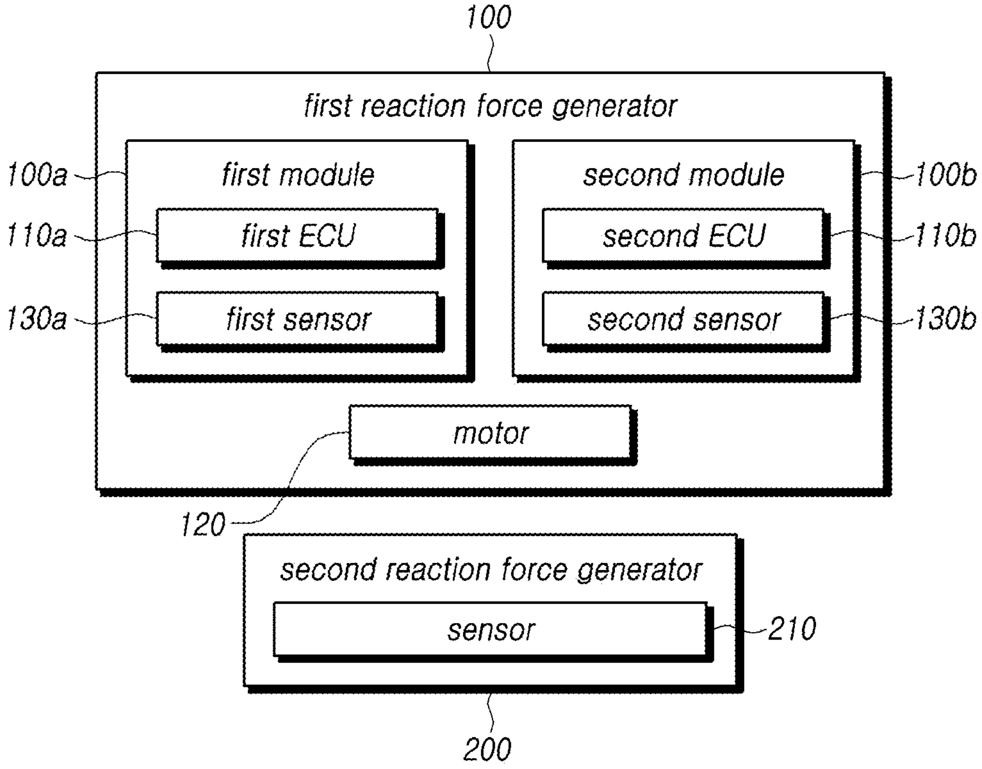
FIG. 6 is a view illustrating a configuration of a steer-by-wire steering device according to one exemplary embodiment of the present disclosure.
Figure 7:
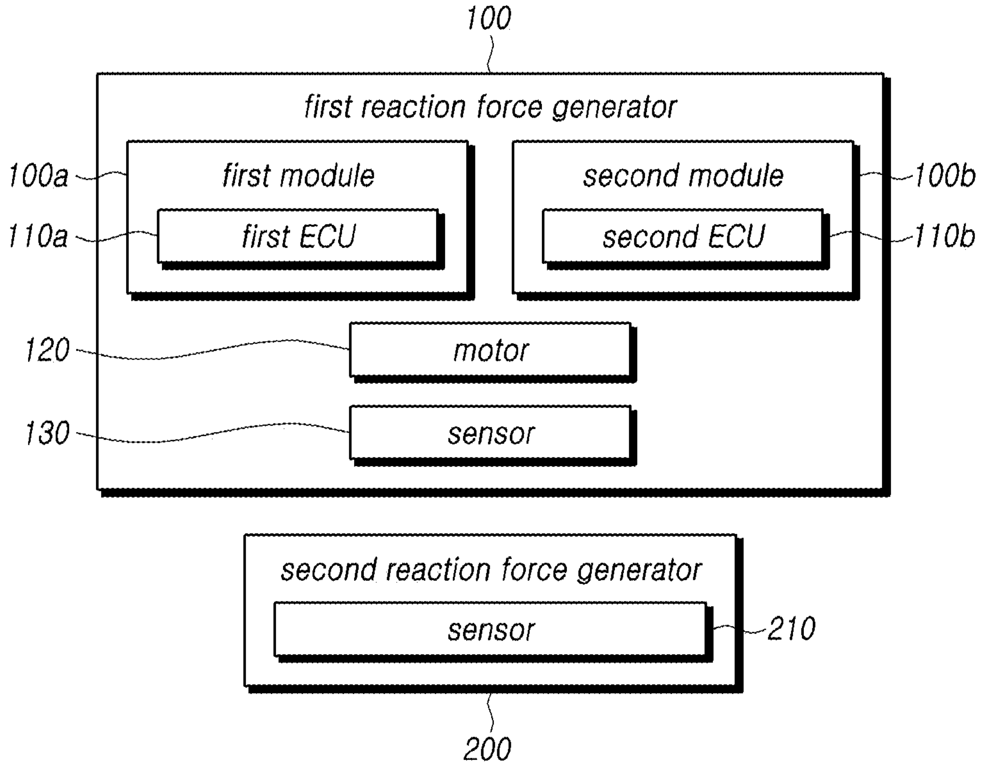
FIG. 7 is a view illustrating a configuration of a steer-by-wire steering device according to one exemplary embodiment of the present disclosure.
Figure 8:
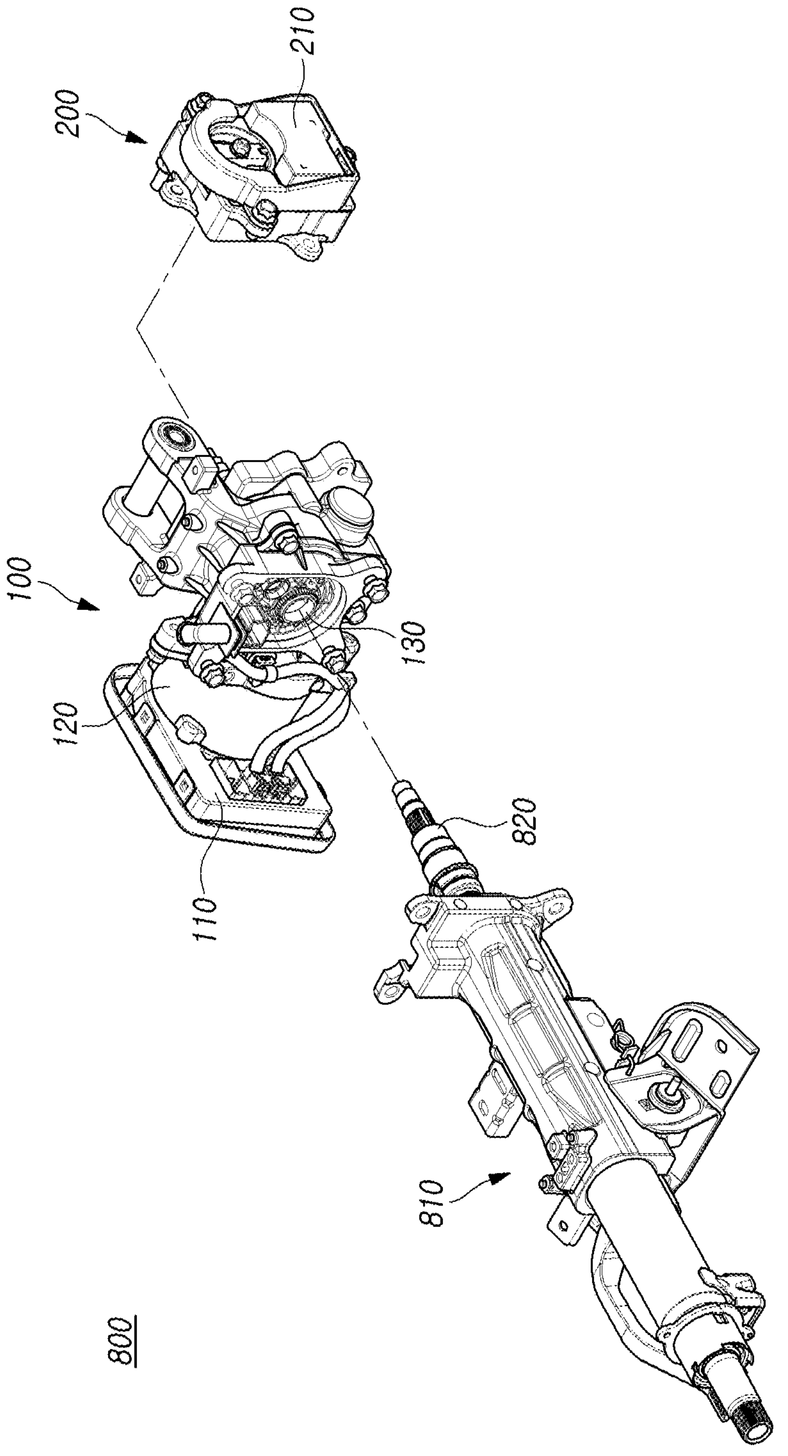
FIG. 8 is an exploded perspective view illustrating a steer-by-wire steering device according to one exemplary embodiment of the present disclosure.
Figure 9:
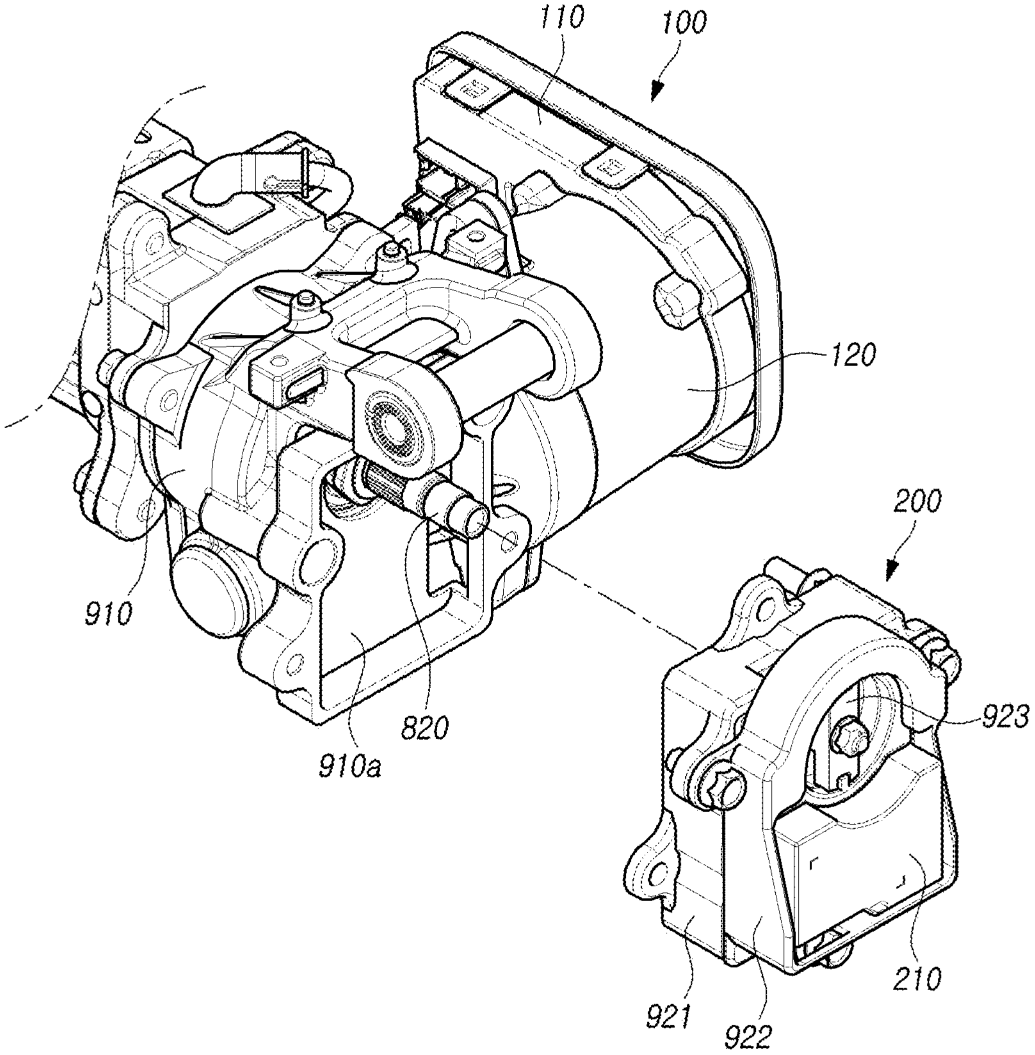
FIG. 9 is an exploded perspective view illustrating a portion of a steer-by-wire steering device according to one exemplary embodiment of the present disclosure.
Figure 10:
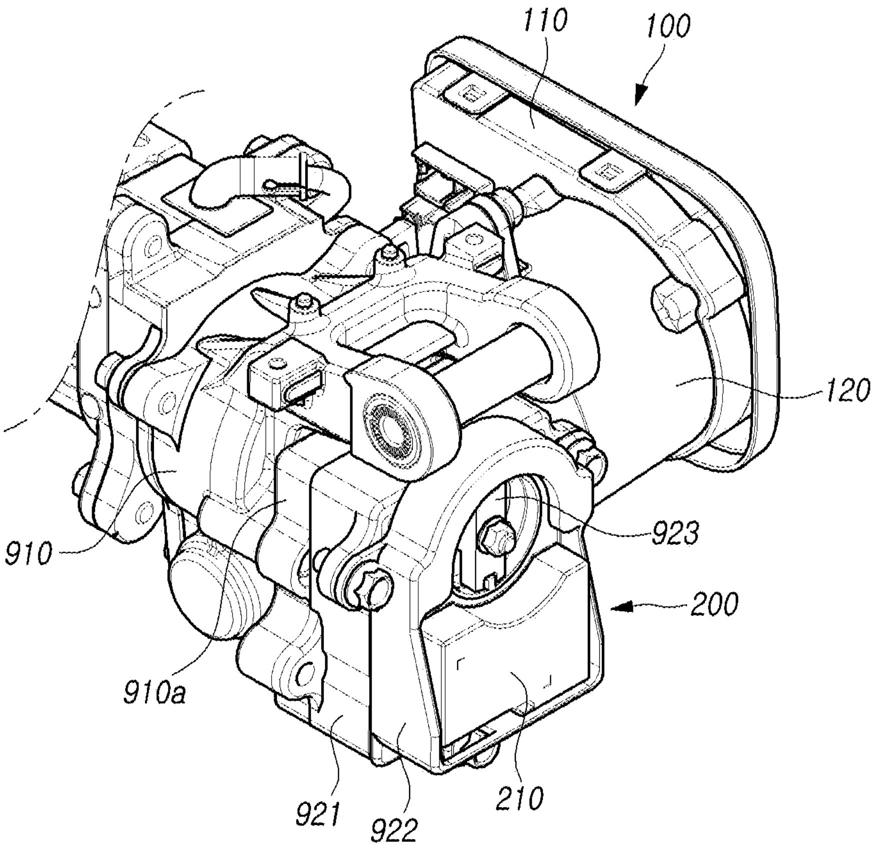
FIG. 10 is a perspective view illustrating a portion of a steer-by-wire steering device according to one exemplary embodiment of the present disclosure.
Figure 11:
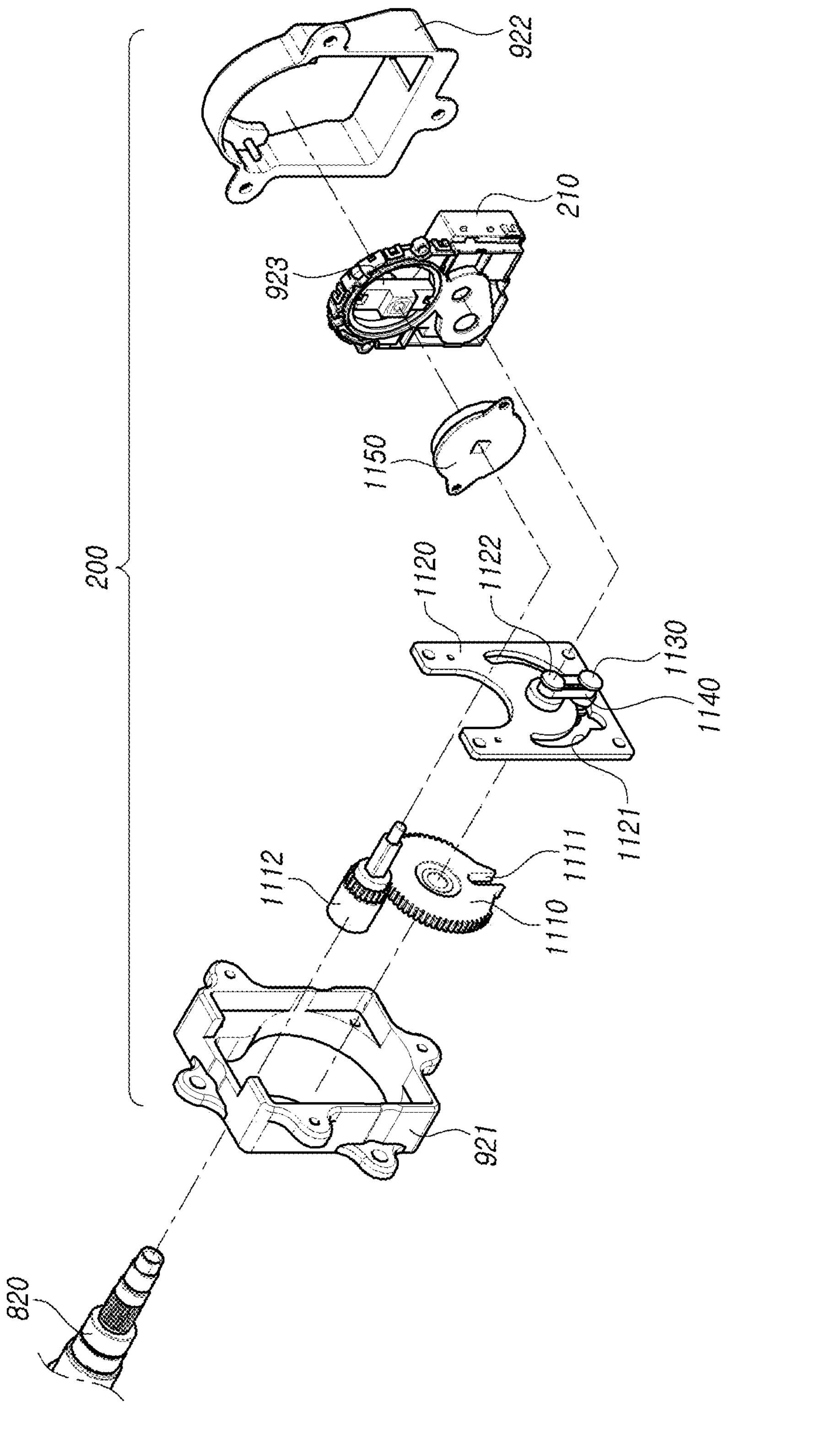
FIG. 11 is an exploded perspective view illustrating a portion of a steer-by-wire steering device according to one exemplary embodiment of the present disclosure.
Figure 12A:
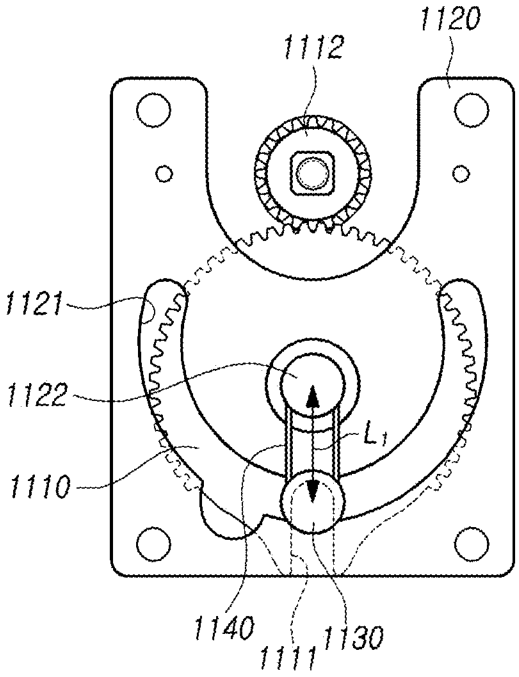
FIGS. 12A and 12B are views illustrating an operational state of a portion of a steer-by-wire steering device according to one exemplary embodiment of the present disclosure.
Figure 12B:
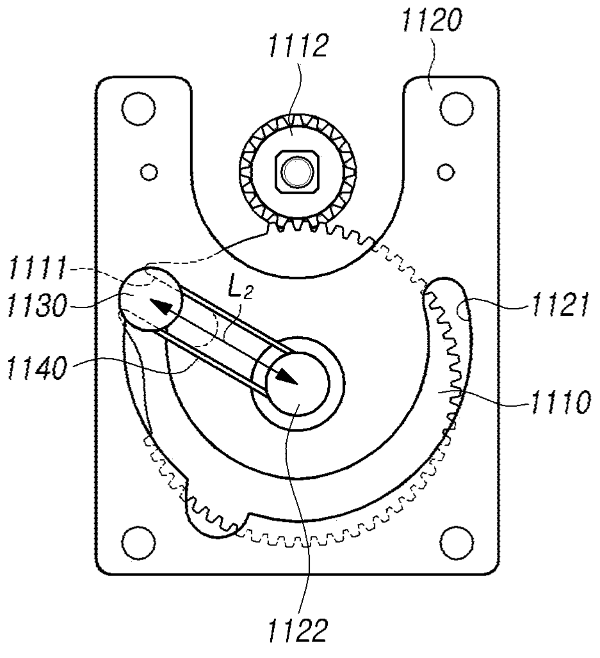

FIG. 1 is a view illustrating a configuration of a steer-by-wire steering device according to one exemplary embodiment of the present disclosure. FIG. 2 is a view illustrating a configuration of a steer-by-wire steering device according to one exemplary embodiment of the present disclosure. FIG. 3 is a view illustrating a configuration of a steer-by-wire steering device according to one exemplary embodiment of the present disclosure. FIG. 4 is a view illustrating a configuration of a steer-by-wire steering device according to one exemplary embodiment of the present disclosure. FIG. 5 is a view illustrating a configuration of a steer-by-wire steering device according to one exemplary embodiment of the present disclosure. FIG. 6 is a view illustrating a configuration of a steer-by-wire steering device according to one exemplary embodiment of the present disclosure. FIG. 7 is a view illustrating a configuration of a steer-by-wire steering device according to one exemplary embodiment of the present disclosure. FIG. 8 is an exploded perspective view illustrating a steer-by-wire steering device according to one exemplary embodiment of the present disclosure. FIG. 9 is an exploded perspective view illustrating a portion of a steer-by-wire steering device according to one exemplary embodiment of the present disclosure. FIG. 10 is a perspective view illustrating a portion of a steer-by-wire steering device according to one exemplary embodiment of the present disclosure. FIG. 11 is an exploded perspective view illustrating a portion of a steer-by-wire steering device according to one exemplary embodiment of the present disclosure. FIGS. 12A and 12B are views illustrating an operational state of a portion of a steer-by-wire steering device according to one exemplary embodiment of the present disclosure.

Referring to FIG. 1, a steer-by-wire steering device according to one exemplary embodiment of the present disclosure may include a steering shaft, a first reaction force generator 100 including at least one motor 120 connected to the steering shaft, at least one electronic control unit (ECU) 110 controlling the at least one motor 120 to generate a first steering reaction force to the steering shaft, and at least one sensor 130 for sensing a steering angle, and a second reaction force generator 200 generating a second steering reaction force generated by rotation of the steering shaft to the steering shaft.

The steering shaft may be provided with both a first steering reaction force generated by the first reaction force generator 100 and a second steering reaction force generated by the second reaction force generator 200.

The first reaction force generator 100 may include at least one motor 120 and at least one ECU 110, and may provide the first steering reaction force generated through motor control based on information such as a steering angle, a steering torque, etc. to the steering shaft. The motor 120 of the first reaction force generator 100 may be connected to the steering shaft through a reducer, e.g., a worm wheel-worm shaft reducer.

The second steering reaction force generated by the second reaction force generator 200 to the steering shaft may be generated by rotation of the steering shaft. A method in which the first reaction force generator 100 generates the first steering reaction force and a method in which the second reaction force generator 200 generates the second steering reaction force may be different. In other words, the method of providing the steering reaction force to the steering shaft may be dualized by the first reaction force generator 100 and the second reaction force generator 200, and thus reliability may be enhanced. The second steering reaction force may be directly generated by rotation of the steering shaft. The second steering reaction force may be mechanically generated by rotation of the steering shaft. The second reaction force generator 200 may generate the second steering reaction force without including a motor connected to the steering shaft and/or an ECU for controlling the motor.

The second reaction force generator 200 may generate the second steering reaction force through a mechanical structure operated by rotation of the steering shaft. The structure for generating the second steering reaction force of the second reaction force generator 200 is not particularly limited, and it is sufficient as long as it is mechanically operated by rotation of the steering shaft. For example, the structure for generating the second steering reaction force of the second reaction force generator 200 may be a structure including a spring, a damper, a gear, a belt, or the like, or may be a structure using hydraulic pressure, friction, or the like. According to an embodiment of the present disclosure, the second reaction force generator 200 may include an elastic member stretched by rotation of the steering shaft, and the second steering reaction force may be provided to the steering shaft by the elastic member. According to an embodiment of the present disclosure, the second reaction force generator 200 may include a gear 1110 being rotatable in engagement with the steering shaft 820, a plate 1120 having a guide rail 1121, a pin 1130 being movable on the guide rail 1121 as the gear 1110 rotates, and an elastic member 1140 providing a restoring force to the center of the guide rail 1121 to the pin 1130 (see FIGS. 8 to 12). The second reaction force generator 200 provides mechanical reliability to the steering reaction force generation structure for providing a sense of steering to the driver.

Each of the first steering reaction force and the second steering reaction force may be independently provided to the steering shaft. Even when the first steering reaction force is not generated due to the failure of the first reaction force generator 100, the second steering reaction force may be continuously provided to the steering shaft. The first steering reaction force may not be generated as the first reaction force generator 100 fails or the first reaction force generator 100 does not generate the steering reaction force. However, the second steering reaction force of the second reaction force generator 200 may be always generated by rotation of the steering shaft when there is no mechanical defect, and thus reliability may be secured.

The first reaction force generator 100 may include at least one sensor 130 for sensing a steering angle. The steering angle sensed by the sensor 130 of the first reaction force generator 100 is provided to a road wheel actuator (RWA) and used to steer the wheel. The RWA may include a sliding bar connected to the wheel and a motor for steering the wheel by sliding the sliding bar. Two opposite ends of the sliding bar are connected to the wheels by tie rods, and the wheels are steered as the sliding bar slides in the axial direction. The RWA may further include a reducer connecting the motor and the sliding bar. For example, the sliding bar may have a rack gear, and the RWA may include a pinion gear engaged with the rack gear. The controller controlling the motor may receive the steering angle sensed by the sensor 130 of the first reaction force generator 100 and drive the motor based thereon to steer the wheel.

Referring to FIG. 2, the second reaction force generator 200 may further include a sensor 210 for sensing the steering angle. In other words, the sensor 130 of the first reaction force generator 100 and the sensor 210 of the second reaction force generator 200 each may sense the steering angle and provide the steering angle to the RWA. In order for the RWA to steer the wheels according to the driver's steering wheel manipulation, steering angle information should be provided to the RWA. As the first reaction force generator 100 and the second reaction force generator 200 each include a sensor for sensing the steering angle, the path for providing steering angle information to the RWA is dualized. Even when the rotation angle information is not provided to the RWA due to a failure of any one of the first reaction force generator 100 and the second reaction force generator 200, the other sensor may provide the rotation angle information to the RWA, thereby securing reliability.

Further, the at least one sensor 130 of the first reaction force generator 100 and the sensor 210 of the second reaction force generator 200 may receive power from power independent from each other. Accordingly, a situation in which the sensor 130 of the first reaction force generator 100 and the sensor of the second reaction force generator 200 cannot simultaneously provide rotation angle information to the RWA due to a power failure may be avoided, and thus reliability may be enhanced.

To enhance reliability of the first reaction force generator 100, the first reaction force generator 100 may include two or more ECUs. The first reaction force generator 100 may include two or more motors. The first reaction force generator 100 may include two or more sensors.

The first reaction force generator 100 may include a first module **100*a* and a second module 100*b*. Each of the first module 100*a* and the second module 100*b* may include at least one of an ECU, a motor, or a sensor. Preferably, each of the first module 100*a* and the second module 100*b*** may include an ECU, and may or may not include a motor and a sensor.

The first reaction force generator 100 may include at least two modules each including at least one of an ECU, a motor, or a sensor. For example, the first reaction force generator 100 may include two modules each including an ECU, a motor, and a sensor. FIGS. 3 to 7 illustrate an embodiment in which the first reaction force generator 100 may include the first module 100*a* and the second module 100*b*, but embodiments are not limited thereto and may include more modules. According to an embodiment of the present disclosure, the first reaction force generator 100 may include at least two ECUs included in different modules.

Referring to FIG. 3, the first reaction force generator 100 may include a first module 100*a* and a second module 100*b*. The first module 100*a* may include a first ECU 110*a*, a first motor 120*a*, and a first sensor 130*a*, and the second module 100*b* may include a second ECU 110*b*, a second motor 120*b*, and a second sensor 130*b*.

The first motor 120*a* and the second motor 120*b* may be controlled by the first ECU 110*a* and the second ECU 110*b*, respectively. The first steering reaction force is the sum of the reaction force generated by the first module 100*a* and the reaction force generated by the second module 100*b*. The first steering force may be generated by the first module 100*a*, by the second module 100*b*, or by the first module 100*a* and the second module 100*b*.

When the first ECU 110*a* and/or the first motor 120*a* fails and the first module 100*a* is unable to generate the steering reaction force, the second module 100*b* may generate the steering reaction force. When the second ECU 110*b* and/or the second motor 120*b* fails and the second module 100*b* is unable to generate the steering reaction force, the first module 100*a* may generate the steering reaction force.

Each of the first sensor 130*a* of the first module 100*a* and the second sensor 130*b* of the second module 100*b* may sense the steering angle and may provide the sensed steering angle to the RWA. When the rotation angle information may not be provided to the RWA due to a failure in any one of the first sensor 130*a* and the second sensor 130*b*, the RWA may steer the wheel based on the rotation angle information provided by the other.

Referring to FIG. 4, the second reaction force generator 200 may include a sensor 210 for sensing the steering angle. In other words, the first sensor 130*a*, the second sensor 130*b*, and the sensor 210 of the second reaction force generator 200 each may provide steering angle information to the RWA, so that reliability may be further enhanced.

The sensor 210 of the second reaction force generator 200 may receive power from a power source independent of the first sensor 130*a* and the second sensor 130*b*. Accordingly, a situation in which the sensor 210 of the second reaction force generator 200 is unable to provide the rotation angle information to the RWA simultaneously with the first sensor 130*a* and the second sensor 130*b* due to a power failure may be avoided, and thus reliability may be enhanced. The power of the first sensor 130*a* and the power of the second sensor 130*b* may also be independent from each other. In other words, the power of the first sensor 130*a*, the power of the second sensor 130*b*, and the power of the sensor 210 of the second reaction force generator 200 may be independent.

Hereinafter, in the embodiments illustrated in FIGS. 5 to 7, the same matters as the embodiments illustrated in FIGS. 3 and 4 will be briefly described and the differences will be mainly described.

Referring to FIG. 5, the first reaction force generator 100 may include a first module 100*a*, a second module 100*b*, and a sensor 130. The first module 100*a* may include a first ECU 110*a* and a first motor 120*a*, and the second module 100*b* may include a second ECU 110*b* and a second motor 120*b*.

The first motor 120*a* and the second motor 120*b* may be controlled by the first ECU 110*a* and the second ECU 110*b*, respectively, and generate a steering reaction force. If any one of the first module 100*a* and the second module 100*b* is unable to generate the steering reaction force due to a failure, the other may generate the steering reaction force.

Compared to the embodiment illustrated in FIG. 3, the first reaction force generator 100 may include only one sensor 130. Further, the second reaction force generator 200 may include a sensor 210 for sensing the steering angle. The sensor 130 of the first reaction force generator 100 and the sensor 210 of the second reaction force generator 200 each may sense the steering angle and provide the steering angle to the RWA.

The sensor 130 of the first reaction force generator 100 and the sensor 210 of the second reaction force generator 200 may receive power from power independent from each other. Accordingly, a situation in which the sensor 130 of the first reaction force generator 100 and the sensor 210 of the second reaction force generator 200 cannot simultaneously provide rotation angle information to the RWA due to a power failure may be avoided, and thus reliability may be enhanced.

Referring to FIG. 6, the first reaction force generator 100 may include a first module 100*a*, a second module 100*b*, and a motor 120. The first module 100*a* may include a first ECU 110*a* and a first sensor 130*a*, and the second module 100*b* may include a second ECU 110*b* and a second sensor 130*b*.

The motor 120 may be controlled by the first ECU 110*a* or the second ECU 110*b* and may generate a steering reaction force. Either the first ECU 110*a* or the second ECU 110*b* may override the other in controlling the motor 120. When either the first ECU 110*a* or the second ECU 110*b* is unable to control the motor 120, the other one may control the motor 120 to generate a steering reaction force.

Compared to the embodiments illustrated in FIGS. 3 to 5, the number of motors occupying a high proportion of the production cost is reduced, thereby securing reliability and suppressing an increase in the production cost. The failure rate of the motor is significantly lower than the failure rate of the ECU or the sensor, and thus reliability is not lower than when a plurality of motors are included.

The sensor 210 of the second reaction force generator 200 may receive power from a power source independent of the first sensor 130*a* and the second sensor 130*b*. Accordingly, a situation in which the sensor 210 of the second reaction force generator 200 is unable to provide the rotation angle information to the RWA simultaneously with the first sensor 130*a* and the second sensor 130*b* due to a power failure may be avoided, and thus reliability may be enhanced. The power of the first sensor 130*a*, the power of the second sensor 130*b*, and the power of the sensor 210 of the second reaction force generator 200 may be independent.

Referring to FIG. 7, the first reaction force generator 100 may include a first module 100*a*, a second module 100*b*, a motor 120, and a sensor 130. The first module 100*a* may include a first ECU 110*a*, and the second module 100*b* may include a second ECU 110*b*.

The motor 120 may be controlled by the first ECU 110*a* or the second ECU 110*b* and may generate a steering reaction force. Either the first ECU 110*a* or the second ECU 110*b* may override the other in controlling the motor 120. When either the first ECU 110*a* or the second ECU 110*b* is unable to control the motor 120, the other one may control the motor 120 to generate a steering reaction force. As one motor is controlled by the first ECU 110*a* or the second ECU 110*b*, reliability of the steering reaction force providing structure may be secured while suppressing an increase in production costs.

The sensor 130 of the first reaction force generator 100 and the sensor 210 of the second reaction force generator 200 may receive power from power independent from each other. Accordingly, a situation in which the sensor 130 of the first reaction force generator 100 and the sensor 210 of the second reaction force generator 200 cannot simultaneously provide rotation angle information to the RWA due to a power failure may be avoided, and thus reliability may be enhanced.

Hereinafter, a steer-by-wire steering device 800 according to an embodiment of the present disclosure is described with reference to FIGS. 8 to 12.

Referring to FIG. 8, the steering column 810 may receive the steering shaft 820, and the steering shaft 820 may be connected to a steering wheel (not shown) and may rotate according to the steering wheel manipulation by the driver. The structure of the steering column 810 is similar to that commonly known, and thus a detailed description thereof will be omitted.

The first reaction force generator 100 may include an ECU 110, a motor 120, and a sensor 130. The sensor 130 of the first reaction force generator 100 may be a sensor coupled to the steering shaft 820 to sense not only the steering angle but also the steering torque. The motor 120 may be connected to the steering shaft 820 and may be connected via, e.g., a worm wheel-worm shaft reducer. The reducer structure connecting the motor 120 and the steering shaft 820 is similar to what is commonly known, and thus a detailed description thereof will be omitted.

The motor 120 and the ECU 110 may be configured as a power pack received in one housing. The ECU 110 may control the motor 120 to generate a first steering reaction force. Although not illustrated in detail, two PCBs may be received in the power pack housing, and each PCB may constitute the first ECU 110*a* of the first module 100*a* and the second ECU 110*b* of the second module 100*b*.

The second reaction force generator 200 may include a sensor 210 for sensing the steering angle.

In other words, the embodiment illustrated in FIGS. 8 to 12 may correspond to the embodiment illustrated in FIG. 2 or the embodiment illustrated in FIG. 7. The embodiments illustrated in FIGS. 1 and 3 to 6 may be designed by appropriately changing the structure of the embodiments illustrated in FIGS. 8 to 12.

Referring to FIGS. 9 to 10, the second reaction force generator 200 may include a housing 921 and a sensor cover 922. The sensor cover 922 may be coupled to the housing 921 and may receive the sensor 210 and a gear 1110 to be described below. The first reaction force generator 100 may include a gear housing 910 coupled with the motor 120 and the steering column 810, and the housing of the second reaction force generator 200 may be coupled to a coupling portion 910*a* formed at an end portion of the gear housing 910. The second reaction force generator 200 may be coupled to the gear housing 910 by bolting, and may be easily detached for repair, specification change, and the like.

The steering shaft 820 may pass through the gear housing 910 and protrudes to the coupling portion 910*a*. The second reaction force generator 200 may provide the second steering reaction force to a portion protruding to the coupling portion 910*a* of the steering shaft 820. Further, the second reaction force generator 200 may include a sensor 210 including a rotor 923 coupled to an end portion of the steering shaft 820 to sense the steering angle from rotation of the rotor 923. The sensor 130 of the first reaction force generator 100 and the sensor 210 of the second reaction force generator 200 may receive power from power independent from each other.

A detailed configuration and operation of the second reaction force generator 200 according to an embodiment of the present disclosure is described with reference to FIGS. 11 and 12. The second reaction force generator 200 may include a gear 1110 being rotatable in engagement with the steering shaft 820, a plate 1120 having a guide rail 1121, a pin 1130 being movable on the guide rail 1121 as the gear 1110 rotates, and an elastic member 1140 providing a restoring force to the center of the guide rail 1121 to the pin 1130.

The gear 1110 may be rotated by rotation of the steering shaft 820. As illustrated in the drawings, the gear 1110 may be engaged with the steering shaft 820 via an intermediate shaft 1112. The intermediate shaft 1112 may be coupled to an end portion of the steering shaft 820, and may have gear teeth engaged with the gear 1110. As is described below, the maximum steering angle may be limited or adjusted by using the gear ratio between the intermediate shaft 1112 and the gear 1110 and the moving distance of the pin 1130 on the guide rail 1121.

The plate 1120 may have a guide rail 1121, and the pin 1130 may be inserted into the guide rail 1121 to move along the guide rail 1121. In the drawings, an embodiment in which the guide rail 1121 is substantially in an arc shape is illustrated, but embodiments are not necessarily limited thereto. For example, the guide rail 1121 may have a straight or curved shape. The pin 1130 may be movable on the guide rail 1121 as the gear 1110 rotates.

The elastic member 1140 may provide a restoring force to the center of the guide rail 1121 to the pin 1130. The restoring force provided by the elastic member 1140 to the pin 1130 may become the second steering reaction force provided to the steering shaft 820 through the gear 1110, the intermediate shaft 1112, and the like. In the neutral state of the steering wheel, the pin 1130 may be located in the middle of the guide rail 1121 (see FIG. 12A), and as the steering angle increases, the restoring force by the elastic member 1140 may increase. In other words, as the driver manipulates the steering wheel, the second steering reaction force may be mechanically generated, and the steering wheel may be returned to the neutral position by the second steering reaction force (On-Centering). As long as the elastic member 1140 is capable of providing a restoring force to the pin 1130, the elastic member 1140 is not limited to the shape illustrated in the drawings. For example, the elastic member 1140 may be a coil spring.

The rotation of the steering shaft 820 may be stopped as the pin 1130 is supported on two opposite ends of the guide rail 1121. In other words, the moving range of the pin 1130 may be limited between two opposite ends of the guide rail 1121, and the rotation of the gear 1110 and the steering shaft 820 may be limited as the moving range of the pin 1130 is limited. The maximum steering angle of the steering shaft 820 may be adjusted to the moving range of the pin 1130 on the guide rail 1121 and the gear ratio between the gear 1110 and the steering shaft 820. For example, if the rotation angle of the gear 1110 may be limited to a total of 240 degrees by the pin 1130 and the guide rail 1121 and the gear ratio of the gear 1110 to the steering shaft 820 is 1:3, the rotation range of the steering shaft 820 may be limited to 720 degrees (one turn to the left and right).

An embodiment in which a restoring force is provided by the elastic member 1140 is described in more detail. The plate 1120 may be provided with a central shaft 1122 to which one end of the elastic member 1140 is coupled, and the other end of the elastic member 1140 may be coupled to the pin 1130. In other words, two opposite ends of the elastic member 1140 may be coupled to the central shaft 1122 and the pin 1130, respectively. Further, the guide rail 1121 may be formed such that the center thereof is closest to the central shaft 1122 and farther away from the central shaft 1122 toward two opposite ends thereof.

As illustrated in FIG. 12, as the center of the guide rail 1121 is formed to be closest to the central shaft 1122, when the pin 1130 is located at the center of the guide rail 1121, the length of the elastic member 1140 may be the shortest as L1 (see FIG. 12A). As the pin 1130 moves from the center of the guide rail 1121 toward two opposite ends, the distance between the pin 1130 and the central shaft 1122 may increase, and the length of the elastic member 1140 may increase. Accordingly, the elastic member 1140 may provide a restoring force to the center of the guide rail 1121 to the pin 1130. The length of the elastic member 1140 may be the longest as L2 (see FIG. 12B) when the pin 1130 is positioned at two opposite ends of the guide rail 1121. According to an embodiment of the present disclosure, the elastic member 1140 may be a belt connected to the central shaft 1122 and the pin 1130.

As illustrated in the drawings, the gear 1110 may be provided coaxially with the central shaft 1122. The gear 1110 may be coupled to the central shaft 1122 through a bearing. The gear 1110 may have a slit 1111 where the pin 1130 is inserted to be movable on the guide rail 1121 as the gear 1110 rotates. In other words, the pin 1130 is simultaneously inserted into the slit 1111 of the gear 1110 and the guide rail 1121 of the plate 1120. However, since the distance between the pin 1130 and the central shaft 1122 is changed in the radial direction by the shape of the guide rail 1121, the slit 1111 may provide a path through which the pin 1130 may be movable in the radial direction. In other words, the slit 1111 is formed to have a radial length greater than or equal to the distance difference L2–L1 between the center of the guide rail 1121 and the central shaft 1122 at two opposite ends thereof, so that the pin 1130 is movable in the circumferential direction and the radial direction on the guide rail 1121 and the slit 1111.

Further, the second reaction force generator 200 may further include a damper 1150 for providing damping to rotation of the steering shaft 820. The damper 1150 may be coupled to an end portion of the intermediate shaft 1112 as shown in the drawings. The damper 1150 may prevent the driver's abrupt steering wheel manipulation or sudden steering wheel rotation by the second steering reaction force.

Hereinafter, a steer-by-wire steering device according to one exemplary embodiment of the present disclosure is described, and the same components as those of the above-described embodiments will be denoted by the same reference numerals, and detailed descriptions thereof will be omitted.

A steer-by-wire steering device according to one exemplary embodiment of the present disclosure may include a steering shaft 820, a first reaction force generator 100 including at least one motor 120 connected to the steering shaft 820, at least one electronic control unit (ECU) 110 controlling the at least one motor 120 to generate a first steering reaction force to the steering shaft 820, and at least one sensor 130 for sensing a steering angle, and a second reaction force generator 200 including a gear 1110 being rotatable in engagement with the steering shaft 820, a plate 1120 having a guide rail 1121, a pin 1130 being movable on the guide rail 1121 as the gear 1110 rotates, and an elastic member 1140 providing a restoring force to a center of the guide rail 1121 to the pin 1130 and generating a second steering reaction force generated by rotation of the steering shaft 820 to the steering shaft 820.

According to an embodiment of the present disclosure, the second reaction force generator 200 may further include a sensor 210 for sensing a steering angle.

According to an embodiment of the present disclosure, the at least one sensor 130 of the first reaction force generator 100 and the sensor 210 of the second reaction force generator 200 may receive power from power sources independent from each other.

According to an embodiment of the present disclosure, the rotation of the steering shaft 820 may be stopped as the pin 1130 is supported on two opposite ends of the guide rail 1121.

According to an embodiment of the present disclosure, the plate 1120 may be provided with a central shaft 1122 to which one end of the elastic member 1140 is coupled, the other end of the elastic member 1140 may be coupled to the pin 1130, and the guide rail 1121 may be formed such that the center thereof is closest to the central shaft 1122 and is farther away from the central shaft 1122 toward two opposite ends thereof.

According to an embodiment of the present disclosure, the elastic member 1140 may be a belt connected to the central shaft 1122 and the pin 1130.

According to an embodiment of the present disclosure, the gear 1110 may be provided coaxially with the central shaft 1122.

According to an embodiment of the present disclosure, the gear 1110 may have a slit 1111 that provides a path where the pin 1130 is inserted to be movable in a radial direction.

According to an embodiment of the present disclosure, the second reaction force generator 200 may further include a damper 1150 for providing damping to rotation of the steering shaft 820.

The ECU 110 of the apparatus according to an exemplary embodiment of the present disclosure may be a processor (e.g., computer, microprocessor, CPU, ASIC, circuitry, logic circuits, etc.). The ECU 110 may be implemented by a non-transitory memory storing, e.g., a program(s), software instructions reproducing algorithms, etc., which, when executed, performs various functions described hereinafter, and a processor configured to execute the program(s), software instructions reproducing algorithms, etc. Herein, the memory and the processor may be implemented as separate semiconductor circuits. Alternatively, the memory and the processor may be implemented as a single integrated semiconductor circuit. The processor may embody one or more processor(s).

By the so-shaped steer-by-wire steering device, there may be provided a steer-by-wire steering device that may provide a steering reaction force to the driver when the electronic control system fails by securing mechanical reliability, suppress an increase in production costs while enhancing the reliability of the steering reaction force providing structure, and secure the reliability of the steering angle sensing structure.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the disclosure. The above description and the accompanying drawings provide an example of the technical idea of the disclosure for illustrative purposes only. That is, the disclosed embodiments are intended to illustrate the scope of the technical idea of the disclosure. Thus, the scope of the disclosure is not limited to the embodiments shown, but is to be accorded the widest scope consistent with the claims. The scope of protection of the disclosure should be construed based on the following claims, and all technical ideas within the scope of equivalents thereof should be construed as being included within the scope of the disclosure.

What is claimed is:

1. A steer-by-wire steering device, comprising:

a steering shaft;

a first reaction force generator including at least one motor connected to the steering shaft, at least one electronic control unit (ECU) controlling the at least one motor to generate a first steering reaction force to the steering shaft, and at least one sensor for sensing a steering angle; and a second reaction force generator generating a second steering reaction force generated by rotation of the steering shaft to the steering shaft, wherein the second reaction force generator includes:

a gear being rotatable in engagement with the steering shaft;

a plate having a guide rail;

a pin being inserted into and movable along the guide rail as the gear rotates; and an elastic member coupled to the pin and providing a restoring force to a center of the guide rail to the pin.

2. The steer-by-wire steering device of claim 1, wherein the second reaction force generator further includes a sensor for sensing a steering angle.

3. The steer-by-wire steering device of claim 2, wherein the at least one sensor of the first reaction force generator and the sensor of the second reaction force generator receive power from power sources independent from each other.

4. The steer-by-wire steering device of claim 1, wherein rotation of the steering shaft is stopped as the pin is supported on two opposite ends of the guide rail.

5. The steer-by-wire steering device of claim 1, wherein the plate has a central shaft coupled with one end of the elastic member, wherein another end of the elastic member is coupled to the pin, and wherein the guide rail is configured to be closest to the central shaft in a center thereof and to be away from the central shaft toward two opposite ends thereof.

6. The steer-by-wire steering device of claim 5, wherein the elastic member is a belt connected to the central shaft and the pin.

7. The steer-by-wire steering device of claim 5, wherein the gear is configured to be coaxial with the central shaft.

8. The steer-by-wire steering device of claim 7, wherein the gear has a slit that provides a path where the pin is inserted and movable in a radial direction.

9. The steer-by-wire steering device of claim 1, wherein the second reaction force generator further includes a damper for providing damping to the rotation of the steering shaft.

10. A steer-by-wire steering device, comprising:

a steering shaft;

a first reaction force generator including at least one motor connected to the steering shaft, at least one electronic control unit (ECU) controlling the at least one motor to generate a first steering reaction force to the steering shaft, and at least one sensor for sensing a steering angle; and a second reaction force generator including a gear being rotatable in engagement with the steering shaft, a plate having a guide rail, a pin being movable on the guide rail as the gear rotates, and an elastic member providing a restoring force to a center of the guide rail to the pin and generating a second steering reaction force generated by rotation of the steering shaft to the steering shaft, wherein the plate has a central shaft coupled with one end of the elastic member, wherein another end of the elastic member is coupled to the pin, and wherein the guide rail is configured to be closest to the central shaft in a center thereof and to be away from the central shaft toward two opposite ends thereof.

11. The steer-by-wire steering device of claim 10, wherein the second reaction force generator further includes a sensor for sensing a steering angle.

12. The steer-by-wire steering device of claim 10, wherein the at least one sensor of the first reaction force generator and the sensor of the second reaction force generator receive power from power sources independent from each other.

13. The steer-by-wire steering device of claim 10, wherein rotation of the steering shaft is stopped as the pin is supported on two opposite ends of the guide rail.

14. The steer-by-wire steering device of claim 10, wherein the elastic member is a belt connected to the central shaft and the pin.

15. The steer-by-wire steering device of claim 10, wherein the gear is configured to be coaxial with the central shaft.

16. The steer-by-wire steering device of claim 15, wherein the gear has a slit that provides a path where the pin is inserted and movable in a radial direction.

17. The steer-by-wire steering device of claim 10, wherein the second reaction force generator further includes a damper for providing damping to the rotation of the steering shaft.

* * * * *